No. 611,745. Patented Oct. 4, 1898.
Y. WESTERN.
PNEUMATIC TIRE.
(Application filed Apr. 5, 1898.)
(No Model.)
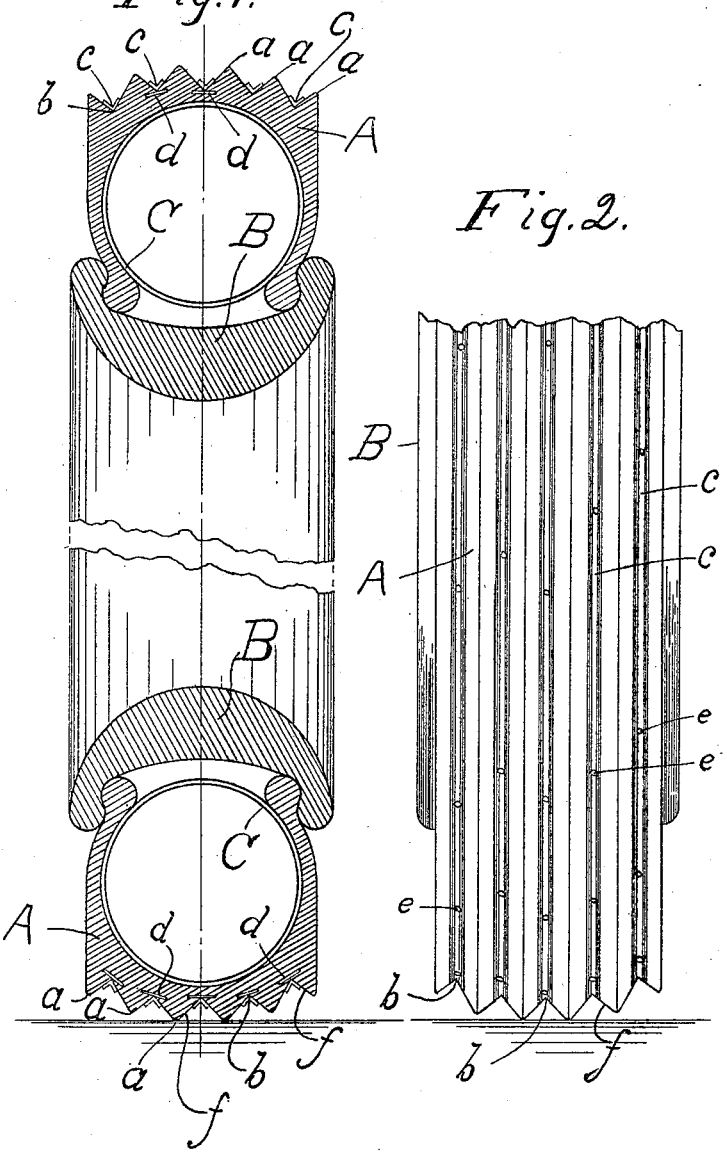
Witnesses:
M. A. Gibbons
Jno. F. Bussler
Inventor,
Ysobel Western,
per North & Davey,
Attorneys.
THE NORRIS PETERS CO., PHOTO-LITHO., WASHINGTON, D. C.

UNITED STATES PATENT OFFICE.

YSOBEL WESTERN, OF HAMILTON, CANADA.

PNEUMATIC TIRE.

SPECIFICATION forming part of Letters Patent No. 611,745, dated October 4, 1898.

Application filed April 5, 1898. Serial No. 676,571. (No model.)

*To all whom it may concern:*

Be it known that I, YSOBEL WESTERN, of the city of Hamilton, in the county of Wentworth, Province of Ontario, Dominion of Canada, have invented a certain new and useful Antipuncturable Non-Slipping Pneumatic Tire, of which the following is a specification.

My invention relates to improvements in pneumatic tires for bicycles in which by means of V-shaped ribs or teeth on the outer face and hard strips in or under the contiguous angles the following results are obtained; and the prime objects of my improvements are, first, to construct a tire that will be simple, safe, and durable; second, to produce a tire that will not slip upon muddy ground or where there is snow, as in winter wheeling; third, to provide a practically non-puncturable tire by placing between the air-chamber and the roadway tough or hard material that will deflect or resist the penetration of all hard and pointed substances.

I attain the objects by the means illustrated in the accompanying drawings, in which—

Figure 1 is a broken vertical section of the entire wheel. Fig. 2 is a front view of the face or outside of the tire, showing the lower part as it rests upon the ground.

Similar letters refer to similar parts in both views.

A is the pneumatic tire, which may be composed of any suitable flexible material, but preferably rubber and canvas, adhering together in layers. The tire A is suitably attached to or mounted upon B, a rim or felly preferably constructed of wood, and the two properly connected by means of cement or friction caused by distending the air-chamber, as shown, or by other suitable means.

C is the inner air-tube, preferably made of rubber; but this inner tube may be absent altogether, the air being held by A, or what is called a "single-tube" tire.

Around the outer face of A are a number of V-shaped ribs or teeth $a$, having an angle sufficiently acute (preferably thirty degrees on the outside to forty-five degrees in the middle) so as to take the load upon their tips and leave some considerable space between the bottom of the grooves $b$ and the ground.

In the bottom of the V-shaped grooves are fastened by means of rivets or cement or other suitable means V-shaped metallic (or other hard material) strips $c$, as shown in both figures. At the bottom of the V-shaped grooves $b$ are embedded in the flexible tire A other flat strips of hard material, preferably iron or steel. The strips $c$ and $d$ may be used together or either may be dispensed with at the inclination of the constructor; but the strip $d$ is preferred, and it should be housed in cuts on each side of the angle $b$ and firmly riveted, as shown at $e$, in Fig. 2, or cemented.

By means of the particular shape of ribs or teeth $a$ they will hold to the roadway under all conditions when ordinary constructions will easily slip. This form is especially effective when the roads are wet, muddy, or snowy; but prevention from slipping is only a part of their great usefulness, for by raising the thin part of tube A far above the ground all small points, as broken glass, &c., are not long enough to puncture the tire; and, again, large points, as pins, thorns, &c., are easily deflected or resisted by means of the hard strips $c$ and $d$, thus making a practically puncture-proof tire and one that will not slip.

The strips $d$ are preferably put immediately under the angles $b$, as shown, but may be much deeper or even on the inner side of A. The V-shaped grooves may be cleaned by a suitably-constructed brake and make slipping almost impossible in sharp turns as the wheel leans over.

I am aware that prior to my invention pneumatic tires with small half-round ribs or beads have been made and for the purpose of preventing slipping and easing the wear, perhaps. I do not therefore claim such a design, broadly, only specifically, as set forth; but What I do claim as my invention, and desire to secure by Letters Patent, is—

1. A pneumatic tire provided with a number of V-shaped ribs or teeth upon its outer surface, in combination with a series of narrow separate strips, one of which is placed at the bottom of each of the V-shaped grooves made in the tire, substantially as shown.

2. V-shaped ribs, in combination with hard

V-shaped plates or strips fastened in the bottom of angles $b$ in a pneumatic tire, substantially as described.

3. In a pneumatic tire, the combination of V-shaped ribs or teeth concentric and circumferential with the tire, the outer side teeth having the greater depth and less angles, together with hard strips or plates $d$, substantially as described.

4. In a pneumatic tire, the combination of V-shaped ribs or teeth $a$, with V-shaped hard plates or strips $c$, together with the flat hard plates or strips $d$, substantially as described.

In testimony that I claim the foregoing as my invention I have signed my name in the presence of two subscribing witnesses.

YSOBEL WESTERN.

Witnesses:
MARY MACGARDEY,
CHAS. LEMON.